United States Patent [19]

Hayashi et al.

[11] Patent Number: 5,555,225
[45] Date of Patent: Sep. 10, 1996

[54] CLOCK GENERATING CIRCUIT AND MICROCOMPUTER INCORPORATING SAME

[75] Inventors: Naoto Hayashi; Kazuo Nakamura, both of Itami, Japan

[73] Assignee: Mitsubishi Denki Kabushiki Kaisha, Tokyo, Japan

[21] Appl. No.: 520,188

[22] Filed: Aug. 28, 1995

[30] Foreign Application Priority Data

Dec. 14, 1994 [JP] Japan .................................. 6-310942

[51] Int. Cl.⁶ ................................ G04B 47/00; G04F 5/00
[52] U.S. Cl. ............................ 368/10; 368/156; 395/750
[58] Field of Search ............................ 368/10, 155, 156; 331/46, 49; 364/934, 934.51; 395/550, 750

[56] References Cited

U.S. PATENT DOCUMENTS 5,025,387  6/1991  Frame .
5,315,566  5/1994  Stein ........................................ 368/46
5,461,652  10/1995  Hongo ...................................... 368/10

FOREIGN PATENT DOCUMENTS 3-148731  6/1991  Japan .
5-35530   2/1993  Japan .
5-181697  7/1993  Japan .
5-224966  9/1993  Japan .

*Primary Examiner*—Vit W. Miska
*Attorney, Agent, or Firm*—Lowe, Price, LeBlanc & Becker

[57] ABSTRACT

A microcomputer and a clock generator included therein which comprises a first memory and a second memory for storing a signal from CPU, the second memory make it ready for writing when the content of the memory in the first memory is in accord with a predetermined signal, and provides a clock oscillation stop signal for suspending clock oscillation to a clock oscillator when the content of memory in the second memory is in accord with a predetermined signal.

2 Claims, 4 Drawing Sheets

CLOCK GENERATING CIRCUIT AND MICROCOMPUTER INCORPORATING SAME

BACKGROUND OF THE INVENTION

1. Field of the invention

The present invention relates generally to a microcomputer, and more particularly, to a clock generating circuit capable of continuing to generate clocks even if a "runaway" occurs in a central processing unit (CPU) included in the microcomputer, thereby keeping the microcomputer operative.

2. Description of Related Art

In order to avoid the consumption of electricity when the operation of a microcomputer is not necessary, most microcomputers (microcontrollers) built in the electronic apparatus are so devised as to stop the oscillation of clocks and keep themselves inoperative. In general, such clock oscillation stoppage is effected in response to a signal outputted by the CPU (central processing unit).

FIG. 1 is a block diagram showing the configuration of a typical example of the known clock generating circuits provided in microcomputers. In FIG. 1, there is provided a clock generating circuit 5 (hereinafter called "clock generator 5") which includes a clock oscillator 23 oscillated by a ceramic resonator 36. The ceramic resonator 36 is connected to load capacitances C1 and C2 whose other ends are earthed. The junction between the ceramic resonator 36 and the load capacitance C2 is connected to a clock output terminal Xout, and the junction between the ceramic resonator 36 and the load capacitance C1 is connected to an input terminal of an NAND circuit 37 of an clock oscillator 23, and an output terminal of the NAND circuit 37 is connected to the clock output terminal Xout through a damping resistor R. The ceramic resonator 36 provides a positive feed back to the NAND circuit 37.

In addition to the clock oscillator 23, the clock generator 5 includes an R-S flip-flop 35 and a clock oscillation request signal generating division 15 (hereinafter referred to as "division 15"). The other input terminal of the NAND circuit 37 is connected to the output terminal Q of the R-S flip-flop 35. An input terminal S of the R-S flip-flop 35 is connected to the division 15 which generates a clock oscillation request signal in response to the reception of any one of clock oscillation request signals 12a to 12c from outside the microcomputer 1 or a clock oscillation request signals 13a to 13c from inside it. An input terminal R of the R-S flip-flop 35 is connected to a data bus DB of the microcomputer 1.

There is provided a frequency divider 4 which divides the frequency of an oscillating voltage outputted through the clock output terminal Xout to a frequency inherent in the microcomputer 1, and is inputted to the CPU 2. The CPU 2 exchanges data with the memory 3 and peripheral devices through the data bus DB in synchronism with the clock frequency, and arithmetically processes the data.

The clock generator 5 and the microcomputer 1 are operated as follows:

In response to the reception of any one of the clock oscillation request signals 12a to 12c from outside the microcomputer 1 or the clock oscillation request signals 13a to 13c from inside the microcomputer 1, the division 15 inputs a clock oscillation request signal "1" to the input terminal S of the R-S flip-flop 35. In this way the output terminal Q of the R-S flip-flop 35 is ready to output a signal "1".

As a result, the NAND circuit 37 and the damping resistor R provide a voltage to the ceramic resonator 36, wherein the voltage has a resonance frequency inherent in the ceramic resonator 36, thereby maintaining the resonance motive voltage occurring in the ceramic resonator 36. The frequency divider 4 divides down this resonance voltage to a clock frequency inherent in the microcomputer 1 which is then inputted to the CPU 2 to operate it.

When the operation of the microcomputer 1 becomes unnecessary, the CPU 2 executes a clock oscillation stop order OP 1 stored in the memory 3, and inputs a clock oscillation stop signal "1" to the input terminal R of the R-S flip-flop 35 through the data bus DB. In this way the output terminal Q of the R-S flip-flop 35 is ready to output "0".

As a result, the output of the NAND circuit 37 becomes "1" and is stabilized, thereby stopping the resonance of the ceramic resonator 36. Because of having no supply of clocks to the CPU2, the microcomputer 1 stops.

If a "runaway" or malfunction of the CPU 2 occurs, the CPU 2 is in danger of executing a non-top address as a top address or executing any data in a non-assigned area as if it is an assigned program in an assigned area. Once such a malfunction occurs, the CPU tends to behave in unforeseen manner. If the data area should contain a similar code data to the clock oscillation stop order OP 1, the CPU 2 will execute the wrong data as the clock oscillation stop order OP 1. As a result, the supply of clock is stopped. Once a "runaway" occurs in the CPU 2 to result in the discontinuation of microcomputer operation, this unwanted situation is likely to continue permanently.

In order to solve the problems discussed above, there are proposals which are disclosed in Japanese Patent Application Laid-Open Publication Nos. 3-148731 (1991) and 5-181697 (1993). The former relates to a clock generator which can stop the oscillation of clocks only when the clock oscillation stop order is executed at a particular limited circumstances such as when the first signal after resetting is an enabling signal. The latter relates to a clock generator which stops the generation of clock pulses in a case where an unexpected error occurs while an error test program is executed. Another proposal is disclosed in Japanese Patent Application Laid-Open Publication No. 5-35530 (1993), relating to a clock generator which executes an address stop at the desired address where the clocks are to be stopped, under the condition whether the order in designated address should execute or not. Another proposal is disclosed in Japanese Patent Application Laid-Open Publication No. 5-224966 (1993), relating to a clock generator which permits the execution of a clock stop order only when the clock stop order is found to be valid by comparison to the predetermined requirement for validity or invalidity.

SUMMARY OF THE INVENTION

The present invention is directed to solve the problems pointed out above, and it is a principal object of the present invention to provide a clock generator capable of keeping the microcomputer operative even if a "runaway" or malfunction occurs in a CPU included in the microcomputer, and a microcomputer incorporating the clock generator.

According to the present invention, there is provided a clock generator which includes a first memory for storing a first signal outputted by the CPU; a first matched signal generating circuit for outputting a second signal permitting the suspension of clock oscillation when the content of the memory stored in the first memory is found in accord with the memory stored therein; a second memory for storing a third signal from the CPU; a second matched signal generating circuit for providing a fourth signal suspending the clock oscillation to the clock oscillator when the content of the memory stored in the second memory is found in accord with the memory stored therein; and a gate circuit for permitting the second memory to store the third signal in response to the second signal outputted by the first matched signal generating circuit.

According to another aspect of the present invention, there is provided a microcomputer which includes a central processing unit (CPU); a first memory for storing a first signal outputted by the CPU; a first matched signal generating circuit for outputting a second signal permitting the suspension of clock oscillation when the content of the memory stored in the first memory is found in accord with the memory stored therein; a second memory for storing a third signal from the CPU; a second matched signal generating circuit for providing a fourth signal suspending the clock oscillation to the clock oscillator when the content of the memory stored in the second memory is found in accord with the memory stored therein; and a gate circuit for permitting the second memory to store the third signal in response to the second signal outputted by the first matched signal generating circuit.

When the first signal stored in the first memory is in accord with a predetermined signal, and the third signal stored in the second memory is in accord with a predetermined signal, the second matched signal generating circuit; outputs the fourth signal whereby the clock oscillation is suspended.

The above and further objects and features of the invention will more fully be apparent from the following detailed description with accompanying drawings.

DESCRIPTION OF THE PREFERRED EMBODIMENTS

Figure 1:
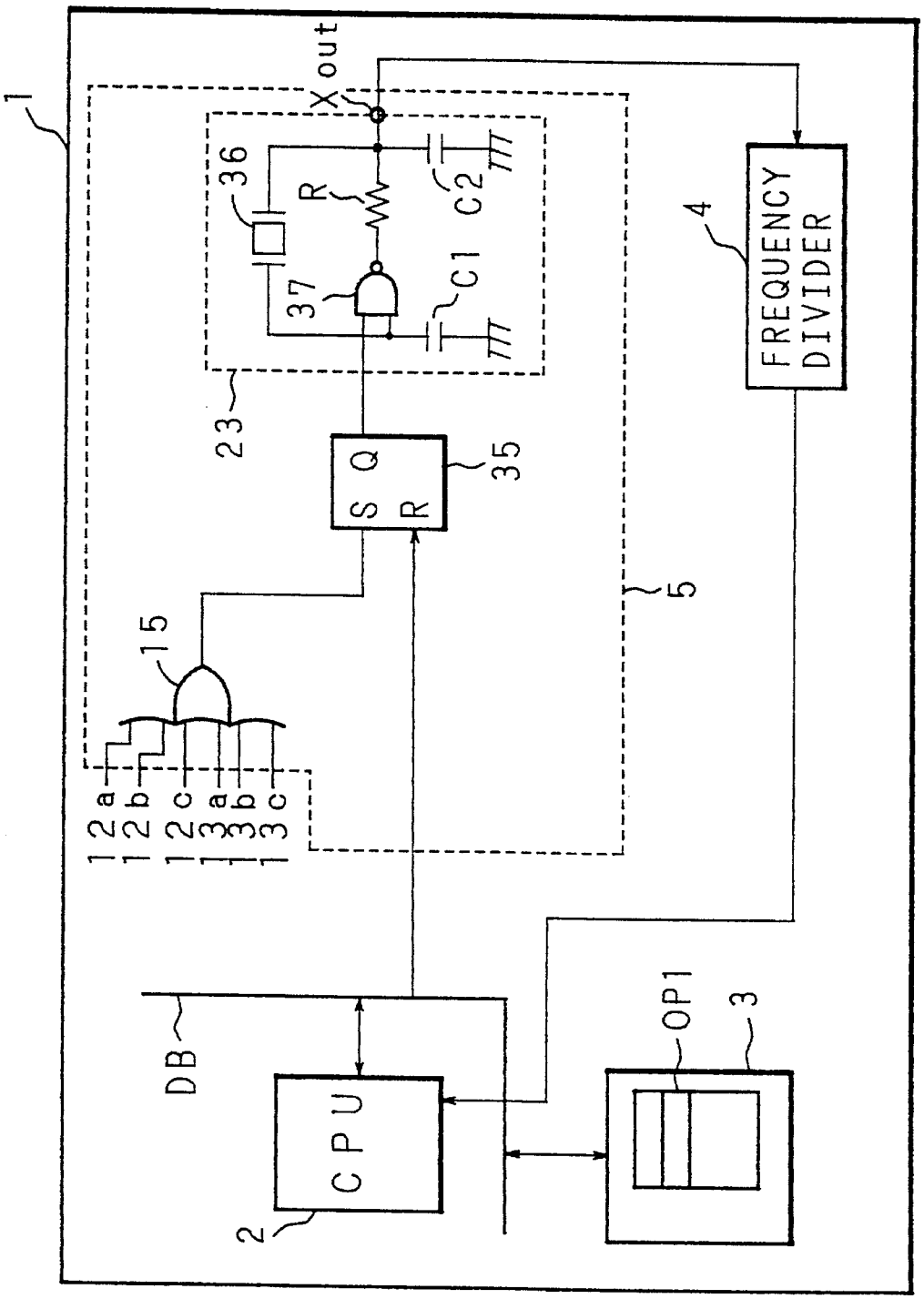
FIG. 1 is a block diagram showing the structure of a know clock generator.
Figure 2:
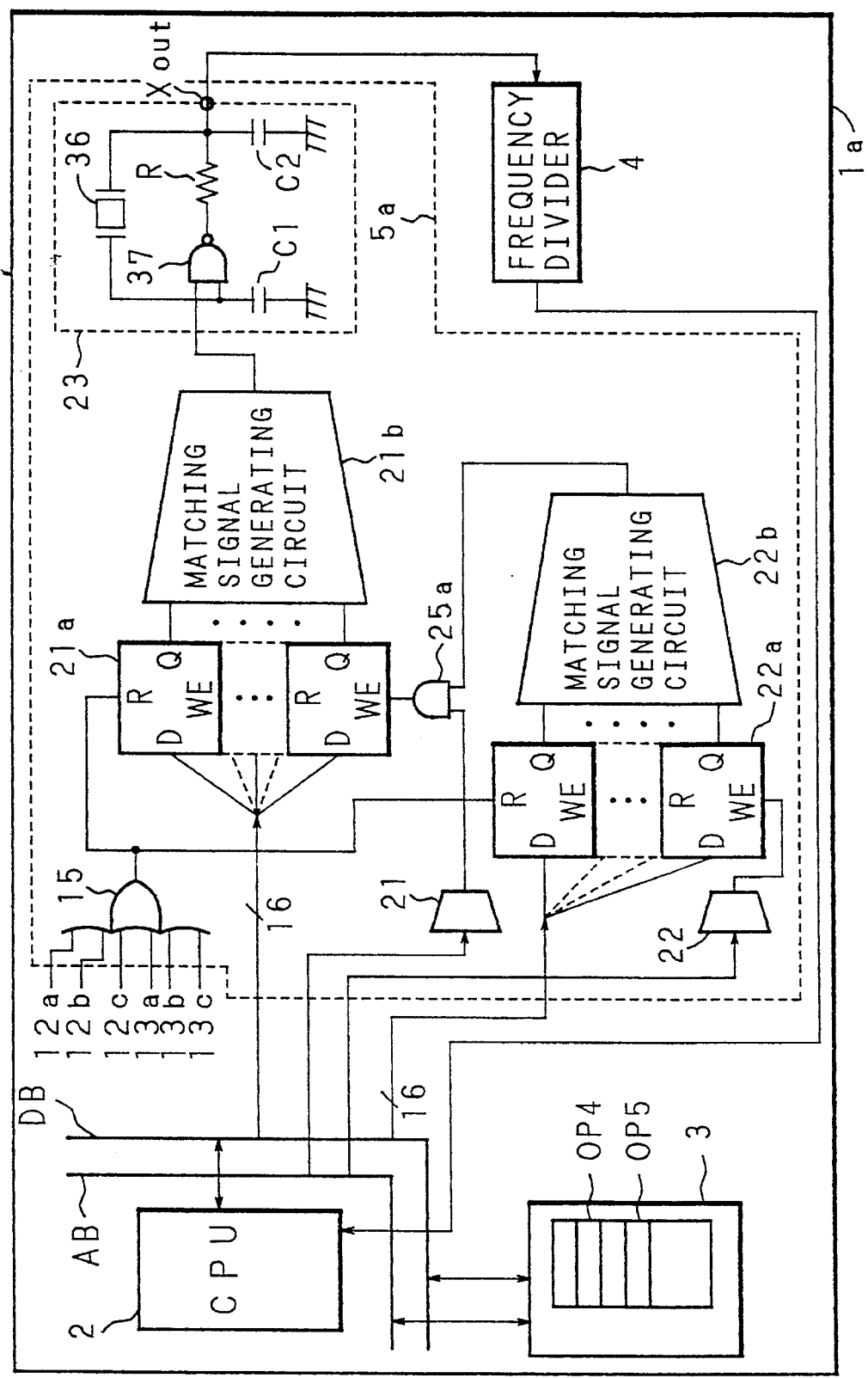
FIG. 2 is a block diagram showing the structure of a clock generator according to the present invention.

The present invention will be described by way of examples which are illustrated in the drawings. Embodiment 1:

Referring to FIG. 2, wherein like reference numerals designate like elements and components to those in FIG. 1, the exemplary clock generator (generating circuit) 5a includes a clock oscillator 23 oscillated by a ceramic resonator 36. The ceramic resonator 36 is connected at both terminals to load capacitors C1 and C2 which are respectively earthed at the other ends. The junction between the ceramic resonator 36 and the load capacitor C2 is connected to a clock output terminal Xout, and the junction between the ceramic resonator 36 and the load capacitor C1 is connected to one of the input terminals of a NAND circuit 37 whose output terminal is connected to a clock output terminal through a damping resistor R. The ceramic resonator 36 provides a positive feed back to the NAND circuit 37.

The clock generator 5a includes a clock oscillator 23, matched signal generating circuits 21b and 22b registers 21a and 22a address decoders 21 and 22, and a gate circuit (AND circuit) 25a. The other input terminal of the NAND circuit 37 of the clock oscillator 23 is connected to the matched signal generating circuit 21a which is connected bit by bit to the register 21a (e.g. 16-bit register) connected to a CPU 2 (central processing unit) of the microcomputer 1a through a data bus DB.

Figure 3:
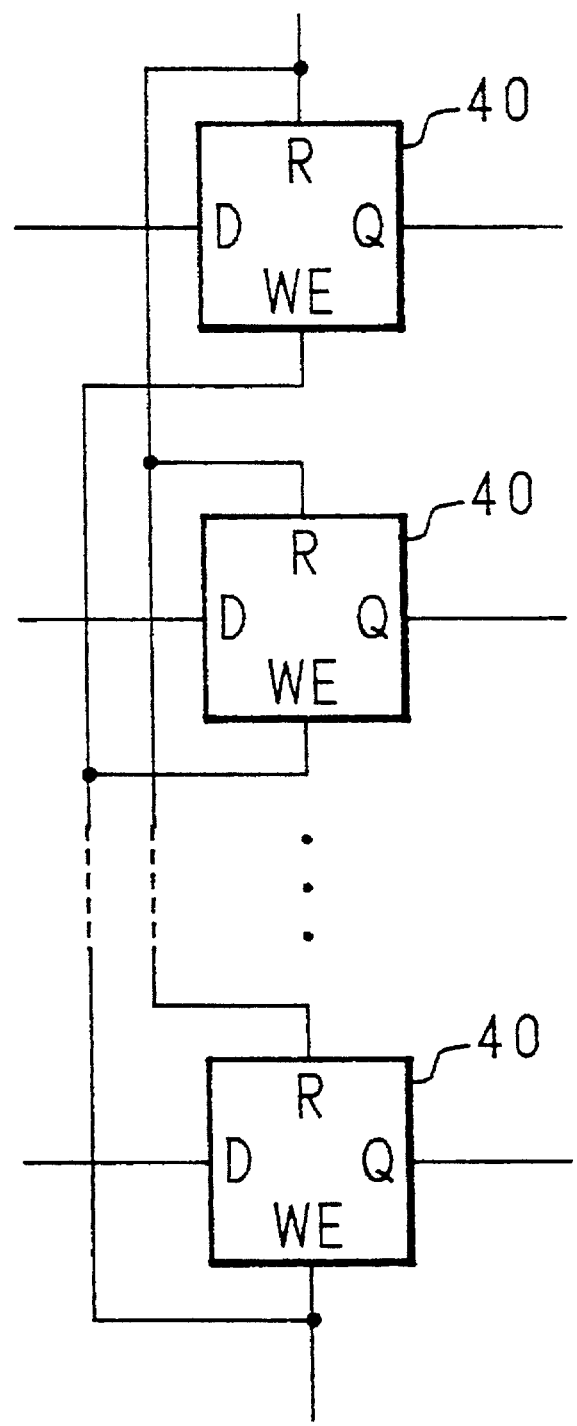
FIG. 3 is a block diagram showing the structure of the register shown in FIG. 2.

FIG. 3 shows an example of the register 21a which consists of the number of latches D 40 corresponding to 16 bits, and the input terminals R and the input terminals WE (Write Enable) of each bit are connected in common to the other elements as follows:

The input terminal R of each bit in the register 21a is connected to the output terminal of a clock oscillation request signal generating division 15 ("the division 15") which outputs a clock oscillation request signal in response to the reception of any one of clock oscillation request signals 12a to 12c from outside the microcomputer 1a or clock oscillation request signals 13a to 13c from inside the microcomputer 1a. The input terminal WE of each bit in the register 21a is connected to the output terminal of the gate circuit 25a, and the other input terminal thereof is connected to the output terminal of an address decoder 21 which is connected to an address bus AB of the microcomputer 1a.

The other input terminal of the gate circuit 25a is connected to the matched signal generating circuit 22b which is connected bit by bit to the register 22a (e.g. 16-bit register) connected to the CPU 2 of the microcomputer 1a through the data bus DB.

Like the resistor 21a, as shown in FIG. 3 the register 22a includes the number of latches D 40 corresponding to 16 bits, and the input terminals R and the input terminals WE (write enable) of each bit are connected in common to other elements as follows:

The input terminal R of each bit in the register 22a is connected to the output terminal of the division 15 which outputs a clock oscillation request in response to the reception of any one of clock oscillation request signals 12a to 12c from outside the microcomputer 1a or clock oscillation request signals 13a to 13c from inside the microcomputer 1a. The input terminal WE of each bit in the register 22a is connected to the output terminal of the address decoder 22 which is connected to the address bus AB of the microcomputer 1a.

The frequency divider 4 divides the frequency of an oscillating voltage from the clock output terminal Xout to a clock frequency inherent in the microcomputer 1a, and then the oscillating voltage is inputted to the CPU 2. The CPU 2 exchanges data with the memory 3 and peripheral devices through the data bus DB in accordance with the clock frequency, and arithmetically processes the data.

Figure 4:
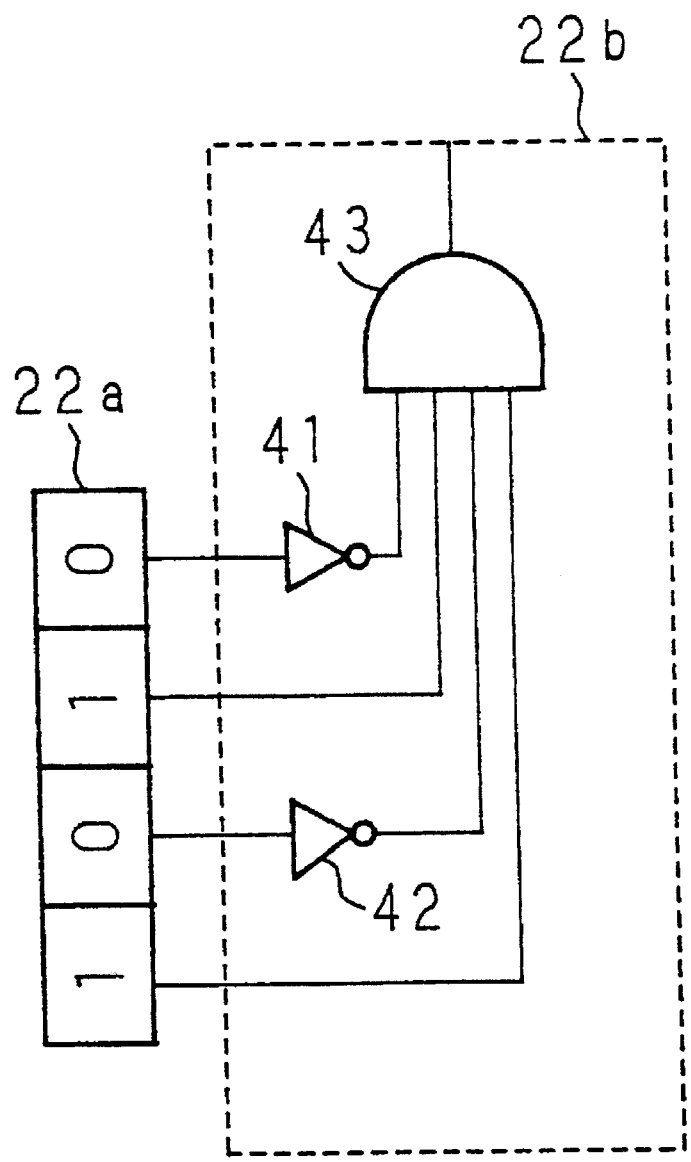
FIG. 4 is a block diagram showing the structure of the matched signal generating circuit shown in FIG. 2.

Referring to FIG. 4, when the matched signal generating circuit detects that 4-bits signal "1, 0, 1, 0" are an accord among them, the output signal "0" is inverted by inverters 41 and 42 so as to change all the four bits into "1" and then it is inputted to an AND circuit 43 to identify an output signal "1" as a matched signal. The same applies to other bit signals than the 4 bits signal, for example, 16-bits. If a "0" matched signal is required, the AND circuit 43 may be replaced by a NAND circuit. In this example, it is arranged such that matched signals for the matched signal generating circuits 21a and 22b may be and "1".

The illustrated clock generator 5a is operated as follows:

If any one of the clock oscillation request signals 12a to 12c from outside the microcomputer 1a or any one of a clock oscillation request signals 13a to 13c inside the microcomputer 1a is received, the division 15 inputs the clock oscillation request signal "1" to the input terminal R of the registers 21a and 22a, thereby resetting the registers 21a and 22a. As a result, the contents of memory of the registers 21a and 22a in the matched signal generating circuits 21a and 22b cannot be in accord with the set signals, and the matched signal generating circuit 21a is ready to generate output signal "1" and the matched signal generating circuit 22b is ready to generate output signal "0".

In response to the output signal "1" from the matched signal generating circuit 21a, the NAND circuit 37 and the damping resistance R give to the ceramic resonator 36 a voltage having a resonance frequency inherent thereto. In this way the resonance motive voltage occurring in the ceramic resonator 36 is maintained. The frequency of this resonance voltage is divided by the frequency divider circuit 4 down to a clock frequency inherent in the microcomputer 1a and inputted thereto, thereby starting to operate the microcomputer 1a. The gate circuit 25a receives an output signal "0" of the matched signal generating circuit 22b at the other terminal, and generates an output "0".

If the operation of the microcomputer 1a becomes unnecessary, the CPU 2 executes the clock oscillation stop order OP4 stored in the memory 3, and provides an address value of the register 22a to the address decoder 22 through the address bus AB and provides a predetermined clock oscillation stop signal to the register 22a through the data bus DB.

At this stage, the address decoder 22 provides an output signal "1" to the input terminal WE of the register 22a and make the register 22a ready for writing. In response to this state, the register 22a stores a predetermined clock oscillation stop signal.

The matched signal generating circuit 22b outputs a matched signal "1" and provides it to the other input terminal of the gate circuit 25a when the predetermined clock oscillation stop signal stored in the register 22a is in accord with the signal stored therein. Since the address decoder 21 receives no predetermined address value, the other input terminal of the gate circuit 25a receives a signal "0". The output of the gate circuit 25a remains "0". While the output of the gate circuit 25a remains "0", the register 21a remains the same, and the matched signal generating circuit 21a continues the state where it outputs a signal "1", thereby enabling the ceramic resonator 38 to continue to oscillate.

In response to the reception of any one of the clock oscillation request signals 12a to 12c from outside the microcomputer 1a or the clock oscillation request signals 13a to 13c from inside the microcomputer 1a, the division 15 outputs a clock oscillation request signal "1". At this moment the register 22a is reset, and the output of the matched signal generating circuit 22b returns to "0".

Then, the CPU 2 executes the clock oscillation stop order OP5 stored in the memory 3, and while providing an address value of the register 21a to the address decoder 21 through the address bus AB, it provides a predetermined clock oscillation stop signal to the register 21a through the data bus DB. The clock oscillation stop signal may be the same as or different from the clock oscillation stop signal delivered to the register 22a.

The address decoder 21, if the received address value is the address value of the register 21a outputs a signal "1" to the gate circuit 25a. At this stage the other input terminal of the gate circuit 25a receives a signal "1" and therefore the gate circuit 25a provides an output signal "1" to the input terminal WE of the register 21a so as to make it ready for writing. The register 21a stores a predetermined clock oscillation stop signal.

The matched signal generating circuit 21a, if the clock oscillation stop signal stored in the register 21a is in accord with the signal set thereto, outputs a matched signal "0".

As a result, the output of the NAND circuit 37 becomes "1" and is stabilized, thereby stopping the ceramic resonator 36 from resonating. Because of having no more supply of clocks to the CPU 2, the microcomputer 1a stops.

In the illustrated example the registers 22a and 21a are respectively composed of a plurality of bits but may be one bit. Alternatively, it can be arranged such that a matched signal is generated when one or more particular bits in the register reach a previously set value.

The predetermined clock oscillation stop signal to be stored in the registers 22a and 21a can be a single kind or plural kinds. In the illustrated example a register is used but so long as it can store a status signal, any other memory device can be used.

The clock generator according to the present invention enables the clock oscillation to continue ever if a runaway or malfunction occurs in the CPU, which is likely to stop the clock oscillation required to operate the microcomputer.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bonds thereof are therefore intended to be embraced by the claims.

What is claimed is:

1. A clock generator permitting a clock oscillator to suspend its own clock oscillation in response to a signal from CPU, said clock generator comprising:

a first memory for storing a first signal outputted by said CPU;

a first matched signal generating circuit for outputting a second signal permitting the suspension of clock oscillation when the content of the memory stored in said first memory is found in accord with the memory stored therein;

a second memory for storing a third signal from said CPU;

a second matched signal generating circuit for providing a fourth signal suspending the clock oscillation to said clock oscillator when the content of the memory stored in said second memory is found in accord with the memory stored therein; and a gate circuit for permitting said second memory to store said third signal in response to said second signal outputted by said first matched signal generating circuit.

2. A microcomputer capable of operating by receiving a signal from a clock oscillator, said microcomputer comprising;

a central processing unit (CPU);

a first memory for storing a first signal outputted by said CPU;

a first matched signal generating circuit for outputting a second signal permitting the suspension of clock oscillation when the content of the memory stored in said first memory is found in accord with the memory stored therein;

a second memory for storing a third signal from said CPU;

a second matched signal generating circuit for providing a fourth signal suspending the clock oscillation to said clock oscillator when the content of the memory stored in said second memory is found in accord with the memory stored therein; and a gate circuit for permitting said second memory to store said third signal in response to said second signal outputted by said first matched signal generating circuit.

* * * * *